2,785,108

NISIN PREPARATIONS

Henry Bernard Hawley, Yeovil, England, assignor to The National Research Development Corporation, London, England No Drawing. Application May 4, 1953, Serial No. 352,980

Claims priority, application Great Britain May 9, 1952

9 Claims. (Cl. 195—96)

The invention relates to a dry preparation containing nisin suitable for the manufacture of cheese and, in particular, processed cheese and products manufactured therefrom, as for example cheese and tomato spread or other spreads, pastes and savouries containing cheese. The object of the incorporation of nisin in such foodstuffs is to prevent or minimise spoilage due to Clostridia, but the preparations may also be used in other foodstuffs such as bread, meat pies, sausages, and meat broths for the suppression of food poisoning organisms such as *Clostridium botulinum*, and *Clostridium welchii* (Nagler strain).

Nisin is the name given to the inhibitory or antibacterial polypeptides produced by growing *Streptococcus lactis*, ATTC No. 11,454, Strain Berridge X13, on nutrient media such, for example, as milk, whey and broth. The preparation of nisin and certain of its properties are referred to in a paper by Mattick and Hirsch "Lancet," July 5, 1947, pages 5 to 8; the paper being entitled "Further Observations on an inhibitory substance (nisin) from Lactic Streptococci." It is well known that certain microorganisms, notably Clostridia, bring about changes in cheese, processed cheese and products derived therefrom which are detrimental to the quality of the products. The detrimental effects may appear during manufacture or upon subsequent storage and one such effect is, for example, the formation of gas holes which gives the product a blown appearance.

Experimental work has shown that nisin and preparations containing nisin inhibit or destroy the micro-organisms which cause this, and thus prevent or retard the damage to the quality of such products. So far the experiments with which we are conversant have involved the incorporation of nisin-containing broths or cultures with the cheese or cheese preparation and this involves the preparation of a mixture having an undesirably high water content. Furthermore, since the inhibitory strains of *Streptococcus lactis* are liable to attack by bacteriophages, it is advantageous not to produce the nisin in the same factory as that in which the cheese is being produced, but to use dry preparations manufactured elsewhere under carefully controlled conditions.

It has been proposed to prepare concentrates of nisin as a step in the experimental preparation of crystalline nisin, but the treatment proposed involved extraction with chloroform, followed by evaporation, and it is not adapted for large scale manufacture. We have attempted to produce a dry preparation containing nisin by spray drying of concentrates produced from broths or aqueous cultures, but we have found that when working at a pH about 6 the drying process involved a very substantial loss of nisin titre, whilst when working in a more acid medium evaporation gives rise to a syrupy liquid which in unsuitable for spray drying.

Furthermore, we have found that the syrupy nature of the liquid produced by evaporation is due to the presence of hydrolysis products of lactose or other polysaccharide substances and to the presence of non-crystallisable material and/or hygroscopic substances produced during the cultivation of the bacteria. Attempts which we have made to spray dry the initial broth, whey or culture have also led to unsatisfactory results, since the product is a sticky paste instead of a free flowing dry powder which is stable on storage. Any processes involving the use of high temperatures or prolonged heating leads to excessive destruction of the nisin, particularly in alkaline media.

The invention consists in a process for the production of a dry nisin preparation, which process comprises subjecting to evaporative drying a nisin culture in the presence of an edible absorbent solid. The process is usually conducted by drying a broth or culture containing nisin in the absence of any added edible absorbent solid until a concentrate having the consistency of a syrupy liquid is produced, and then adding the edible absorbent solid and continuing evaporation to dryness. Various edible absorbent solids may be used, for example, in the production of cheese and cheese products the edible absorbent solid may be milk curd or cheese itself. For other foodstuffs, edible absorbents such as meat or fish powder, tomato powder, wheat flour, cornflour, soya flour, arrowroot, starch, rice powder and pea powder may be employed. The final stage of the evaporative drying may very conveniently be carried out by spray drying although other methods such as roller drying or freeze drying are applicable. The edible absorbents may conveniently be employed at a concentration of approximately 33% calculated on the basis of the total dry matter contained in the material being dried. A higher proportion of edible absorbent may be used, but in general, no advantage is obtained.

In carrying the invention into effect one may start with skimmed milk culture and one of the nisin-producing strains of bacteria, the fermentation so effected producing a mixture of curd and whey. Both these contain nisin, but by adjusting the pH to between 2 and 3 followed by momentary heating to a temperature of about 90° C. or above, the nisin is transferred substantially quantitatively to the whey which is then separated from the curd.

The nisin-containing whey is then concentrated to a syrupy liquid at a pH below 6 in an evaporator, which may be of the climbing film type, although a batch type evaporator may be used, or a low-temperature evaporator operating on the principles of a heat pump may also be used with advantage, since with this type of evaporator the concentration may be effected at temperatures below 38° C. and under such circumstances, the concentration may be conducted to a 50–60% total solids without loss of nisin titre, provided that the pH is maintained between 3 and 4. If, on the other hand, the batch type evaporator is used and the evaporation is conducted at a temperature in the region of 55° C. and under a vacuum of 630 to 710 mm., it is desirable to maintain the pH at 3 and some adjustment of the pH during the process of evaporation may be necessary, in order to minimise the loss of nisin titre during the course of a prolonged evaporation by this method. Experience shows that, when a climbing film evaporator is used under normal conditions of operation of temperature and vacuum, it is practicable to achieve a 5:1 concentration of the solids of the whey, broth or culture at a controlled reaction of preferably approximately pH 3 without any loss of nisin titre.

For the evaporation process, the pH is preferably about 3 and any necessary adjustment of pH may be effected by passing the whey through an ion exchange bed charged with hydrogen ions, or by the addition of a suitable mineral or organic acid. Hydrochloric, sulphuric, phosphoric, lactic, citric or tartaric acids are suitable for this purpose.

The syrupy liquid resulting from evaporation is then mixed with milk curd and spray dried. In an alternative process, the curd initially produced during the fermentation is not separated but the culture is agitated, e. g. in a high speed mixer, to retain the curd in suspension and the curd is utilised as the edible absorbent for the whole of the drying process. In this case, of course, the heating step to transfer the nisin from the curd to the whey is omitted. Yet another alternative is to omit the heating treatment but to separate the curd so that there is produced a whey which is evaporated with an edible absorbent solid other than the curd separating from it to produce a dry nisin preparation of relatively low nisin titre whilst the curd itself having a high nisin content is utilised in the manufacture of another batch of cheese.

In a still further alternative, the curd separated without heating may be re-emulsified in aqueous medium and then subjected to one of the drying processes mentioned above to produce the dry nisin concentrate.

It is also possible to produce nisin from cheese whey and in this process the whey is first neutralised and then cultured with nisin-producing bacteria. The neutralisation of the whey for this process may be effected by the addition of an alkali metal or alkaline earth hydroxide, or by passage through an ion-exchange bed charged with, for instance, hydroxyl or carbonate ions. It has been found, for example, that "De-Acidite E" or one of the Amberlite anion-exchange resins such as IRA 400, or IRA 410, are convenient to use. The capacity of the resin will, of course, vary with the terminal pH of the cheese whey and the nature and proportions of the anions present. As an example, 1 cubic foot of the Amberlite resin IRA 410 charged with hydroxyl ions will neutralise approximately 60 gallons of Cheddar cheese whey of normal reaction.

The concentrated nisin-containing-whey resulting from the evaporation of a cultured whey may be blended with a milk curd or, for example, cheese curd or cheese. In general, it has been found that cheese may be blended into a concentrate by means of a suitable blender, high-speed mixer, or colloid mill without the addition of emulsifying salts, although in the case of very acid or very old hard cheese, the addition of a calcium sequestering agent, such as an alkali metal polyphosphate may prove advantageous when used in amounts not exceeding 2% of the weight of the dry matter of the cheese.

Emulsifiers or stabilisers may be mixed with spray dried powder or may be incorporated during the evaporative concentration or spray drying stages. When emulsifying agents are incorporated with the liquid undergoing concentration it is important that they should not be of alkaline character. Salts, for example, such as alkali metal hydrogen phosphates or citrates or neutral substances such as alginates and pectins may be employed as emulsifying agents and/or stabilisers.

The incorporation of an edible absorbent is essential for the production of a free-flowing spray-dried powder which is stable on storage. The use of milk curd in some form provides a simple means for the dehydration of the water-binding substances (uncrystallisable materials and carbohydrate degradation products) which are formed in the cultures or broths during their preparation and treatment. In the absence of such curd or other absorbent material the water cannot be removed from these substances, and the material will not spray-dry, but forms instead a sticky paste. The absorbent acts as a vehicle.

It has been found that reconstituted milk prepared from skim milk powder forms inter alia a suitable culture medium for the growth of nisin-producing bacteria, and this culture medium may be employed, as well as known culture media, to form a culture suitable for treatment in accordance with either feature of the invention.

When using milk or other media derived from milk products, it has been advantageous to subject the media, prior to inoculation, to a temperature above 100° C., since this leads to the formation of reductones, which stabilise the nisin against oxidation during drying. This is of value when a spray drying process is employed.

When the final stage of drying is effected by spray drying, the spray-drying may be effected with any of the plants normally in use, although a plant is preferred where provision is made for the continuous removal of the powder by means of, for example, cyclone collectors, since the time of contact of the powder with atmospheric oxygen at an elevated temperature is thereby minimised. Using, for example, the Kestner type of plant, it has been found that a satisfactory powder may be obtained with an air inlet temperature of approximately 160° C. and an outlet temperature in the region of 90° C. With a Scott type of spray drier, it has been found, for example, that lower inlet and outlet temperatures may be used and that the use of lower temperatures thereby allows slightly more latitude in the adjustment of the reaction of the material, prior to drying. On the other hand, it has been found that both the size and the type of the plant used for spray drying have a profound effect upon the optimum drying conditions, since the aerodynamic differences between one plant and another, and between different sizes of the same type of plant, vary greatly. It is, therefore, desirable that the optimum conditions should be established in practice. In general, however, it has been found that air inlet temperatures in the region of 140–200° C. and air outlet temperatures in the region of 60–95° C. produce satisfactory results.

The invention is further illustrated in the following examples:

*Example 1*

A 2,000 gallon (9000 litre) culture, prepared from skim milk powder reconstituted to 9.04% total solids and preheated at 95° C. for 30 minutes, was used.

This culture had a titre of 2650 Reading units (serial dilution assay against *Streptococcus agalactiae*, N. I. R. D. Strain T046—by the method described on page 111 et seq. of "Antibiotics," vol. 1, 1949, by Florey and others) and a pH of 4.97.

The pH was reduced to 4.22 by means of 50% v./v. aqueous hydrochloric acid and it was then maintained at 97° C. for 3.25 minutes, the culture being agitated meanwhile. The culture together with the separated curd which was retained in suspension was cooled to 1° C. in each of two capacity vats of 1000 gallons capacity (4500 litres).

These two batches were then processed separately:

(a) In one batch the suspended curd was re-incorporated by means of a high speed submersible mixer prior to feeding to a Scott-type spray-drier. The drying was effected with an air-inlet temperature of 155° C. and an outlet temperature of 91° C. The yield of powder was 873 lbs. with a moisture content of 3.66% and a titre of 2560 Reading units when reconstituted to 9% total solids.

(b) The curd was removed from the second batch and the whey remaining had a titre of 2560 Reading units and a total solids content of 6.51%; the pH value was 4.28; it was heated to 49° C. and passed to a triple effect Kestner-type climbing-film evaporator. The average total solids content of the concentrated whey leaving the evaporator was 32.1% and the volume obtained was 181 gallons (822 litres).

The titre after reconstitution with water to the original total solids was 2560 Reading units. The evaporation was conducted at a vacuum of 630 mm. and a temperature of 53° C. The outflow from the evaporator was bulked and blended with sufficient wheat-flour to raise the total solids to 44.1%.

This mixture was fed to a Kestner-type spray-drier operating on an air inlet temperature of 161° C. and an outlet temperature of 94° C.

A powder containing 3.9% moisture which gave a titre of 2560 Reading units when reconstituted to 9.5% total solids was obtained.

*Example 2*

100 gallons (454 litres) of a whey culture having a titre of 1250 Reading units and a pH value of 5.17 was adjusted to pH 4.05 by the addition of 50% v./v. hydrochloric acid. A quantity of Cheddar cheese was finely ground and emulsified by means of a Colloid Mill with a portion of the whey culture. Sufficient was added to the milk culture to raise the total solids to 11%. This emulsion was dried on rollers heated by steam at 4.5 kg. per sq. cm. pressure. The powder obtained was ground and when reconstituted to 11% total solids had a titre of 1250° Reading units.

I claim:

1. A process for the production of a dry nisin preparation comprising mixing a nisin containing liquid with an absorbent solid edible material, and then evaporatively drying the mixture to a dry stable powder.

2. A process as in claim 1, said edible material further comprising a substance selected from the class consisting of milk curd, cheese curd and cheese.

3. A process as in claim 1, said edible material further comprising a substance selected from the class consisting of a powder of meat, fish, vegetable, wheat, corn, soya, arrowroot, starch, rice and pea.

4. A process as in claim 1, said edible material further comprising substantially one-third of the total solids present in said dry powder.

5. A process as in claim 1, said nisin containing liquid further comprising a milk product culture heated to above 100° C. before inoculation to promote the formation of reductones.

6. A process as in claim 1, further comprising first concentrating said nisin containing liquid in the absence of said edible material.

7. A process as in claim 1, further comprising spray drying said mixture.

8. A process as in claim 1, further comprising preparing said nisin containing liquid by first culturing milk with nisin producing bacteria, removing the curd formed during fermentation, concentrating the whey, reincorporating the curd, and then drying the mixture so formed.

9. A process as in claim 8, further comprising culturing said milk at a pH from about 3 to 6, and heating the same at a temperature of about 90° C.

References Cited in the file of this patent

Mattick et al.: Lancet, July 5, 1947, pages 5 to 8.
Hirsch et al.: Journal of Dairy Research, volume 18, 1951, page 205.
Food Engineering, January 1953, digest of McClintock, Journal Dairy Science (published in Great Britain), June 1952, pages 152, 154.